United States Patent
Kanamitsu (10) Patent No.: US 10,427,629 B1
(45) Date of Patent: Oct. 1, 2019

(54) APPARATUS FOR REDUCING CHARGE FOR VEHICLE BACK GROUND

(71) Applicant: Landmaster Co., Ltd., Yokohama-shi (JP)

(72) Inventor: Toshihisa Kanamitsu, Yokohama (JP)

(73) Assignee: LANDMASTER CO., LTD., Yokohama-Shi (JP)

( * ) Notice: Subject to any disclaimer, the term of this patent is extended or adjusted under 35 U.S.C. 154(b) by 0 days.

(21) Appl. No.: 16/092,041

(22) PCT Filed: Dec. 7, 2017

(86) PCT No.: PCT/JP2017/043950
§ 371 (c)(1),
(2) Date: Oct. 8, 2018

(87) PCT Pub. No.: WO2018/105688
PCT Pub. Date: Jun. 14, 2018

(30) Foreign Application Priority Data

Dec. 8, 2016 (JP) .................................. 2016-238329

(51) Int. Cl.
*B60R 16/06* (2006.01)
*H01F 7/02* (2006.01)

(52) U.S. Cl.
CPC ............... *B60R 16/06* (2013.01); *H01F 7/02* (2013.01)

(58) Field of Classification Search
CPC ........ B60R 16/06; H02G 13/00; H02G 13/80; B64D 37/32; H01F 7/02

(Continued)

(56) References Cited

U.S. PATENT DOCUMENTS 6,653,646 B1 * 11/2003 Shibata .................. B01J 19/081
250/497.1
2004/0238802 A1 12/2004 Inoue
(Continued)

FOREIGN PATENT DOCUMENTS

EP 3064416 9/2016
JP 2000-019296 1/2000
(Continued)

OTHER PUBLICATIONS

SIPO, office action of CN 201780032868.1, dated Apr. 26, 2019.

*Primary Examiner* — Dharti H Patel
(74) *Attorney, Agent, or Firm* — Lex IP Meister, PLLC (57) ABSTRACT

The present invention is to provide apparatus for reducing charge for vehicle that is capable to decrease the charge taken by a vehicle regardless of the type of the drive source, which is more reasonable without relying on external energy supplied from, for example, a battery carried in a vehicle and which enables its small size. The apparatus for reducing charge for vehicle 1 of the present invention includes a body 10 and a conductive wire 20 that extends from this body 10. The body 10 includes a radiation generating layer 11 containing a natural ore containing a radioactive substance, a first metal layer 12 containing a metal with a redox potential of 0 V or less or an alloy of this metal, and a second metal layer 13 containing a metal with a volume electric resistance rate of 4.7 μΩ·cm or less at 0° C. or an alloy of this metal. The conductive wire 20 extends from the second metal layer 13 and is connected with at least one of predetermined electrically connective connections in a vehicle including a minus terminal of a battery provided in the vehicle.

4 Claims, 6 Drawing Sheets (58) Field of Classification Search
USPC .......................................................... 361/216
See application file for complete search history.

(56) References Cited

U.S. PATENT DOCUMENTS

| | | |
|---|---|---|
| 2012/0039012 A1 | 2/2012 | Nakai |
| 2016/0059838 A1 | 3/2016 | Yamada et al. |
| 2016/0280162 A1 | 9/2016 | Yamada et al. |

FOREIGN PATENT DOCUMENTS

| | | |
|---|---|---|
| JP | 2002-055198 | 2/2002 |
| JP | 2004-346898 | 12/2004 |
| JP | 2009-181694 | 8/2009 |
| JP | 2009-191852 | 8/2009 |
| JP | 2010-192177 | 9/2010 |
| JP | 2016-037888 | 3/2016 |
| WO | 2015/064195 | 5/2015 |

* cited by examiner

APPARATUS FOR REDUCING CHARGE FOR VEHICLE BACK GROUND

BACKGROUND (a) Field

The present invention is relates to apparatus for reducing charge for a vehicle.

(b) Description of the Related Art

When a vehicle such as a two-wheeled motor vehicle (motorcycle) and a four-wheeled motor vehicle (automobile) travel, static electricity is generated in the vehicle because of airflow contacting with the vehicle. Static electricity is also generated by repeatedly bringing each part of the tires to contact with or separate from a road surface on the rotation of the wheels or by relatively moving the components of the engine, the brake equipment, etc.

Since the tires have substantially electrically insulate a vehicle from the earth due to their low conductivity, the body, etc., of a vehicle takes charge (generally, positive charge) once static electricity is generated in the vehicle.

The body with positive charge decreases the engine performance. If the engine is a gasoline engine or a diesel engine, the body with positive charge causes inhibited operation of the piston, decreased combustion efficiency of the engine, or inhibited flow of the radiator water and the engine oil, for example. As the result, the driver experiences the decreased force sensitivity and torque sensitivity, the increased engine vibration, or the decreased fuel cost, for example.

Moreover, if a battery is used as the power source for a vehicle such as an electric vehicle, an electric bike, or an electric wheelchair, the friction is affected when the body has a positive charge. As the result, the driver experiences the increased electricity usage, consequently the decreased cruising range.

The body with positive charge also deteriorates the driving comfort. Even if the drive source is any one of a gasoline engine, a diesel engine, and a battery, the body with a positive charge limits the operation of the suspension, the gear, etc. As the result, the driver experiences the increased vibration of tires, etc., or the decreased driving stability.

Therefore, the technique for decreasing the charge taken by a vehicle has been researched, and various techniques have been proposed.

For example, the device described in Patent Document 1 includes a first connection electrically connected with the outer face of the air intake pipe to an engine provided in a vehicle; a second connection electrically connected with the outer face of an engine coolant flow pipe provided in the vehicle; a third connection electrically connected with the outer face of an engine oil pipe provided in the vehicle; first to third conductive wires that connect in parallel the first to the third connections, respectively, with the respective minus terminals of a battery provided in the vehicle; a conductive plate connected with the first to third conductive wires; and a fourth conductive wire that connects a minus terminal of the battery provided in the vehicle with the conductive plate. This device is capable to improve the fuel cost of a vehicle without losing an electrical balance in the vehicle.

Moreover, Non-patent Document 1 discloses that a charging function and a coil function are obtained by devising the length and the winding of the code in the body. Particularly, Non-patent Document 1 discloses that the coil function has a function that removes irregular electricity to stabilize electricity (filter effect). The use of the device described in Non-patent Document 1 can produce a rectification effect by suppressing a voltage drop and cutting electricity to more largely ignite the spark plug longer. As the result, the reduced exhaust of carbon monoxide, the increased fuel cost, and the improved axis output can be expected because even the same amount of gasoline supply can increase the ignition efficiency to get close to perfect combustion.

CITATION LIST

Patent Literature

Patent Document 1: JP 5671720 B1

Non-Patent Literature

Non-patent Document 1: TRICK STAR Nagoya homepage, "PPS," http://www.trueblue.co.jp/about/

SUMMARY

However, both of the devices described in Patent Document 1 and Non-patent Document 1 use a battery as the supply source of negative charge but do not generate negative charge by itself. Then, a more reasonable apparatus needs to be provided without relying on external energy.

Moreover, the device described in Non-patent Document 1 more largely ignites the spark plug longer with the rectification effect produced by suppressing a voltage drop and cutting electricity. Accordingly, the device described in Non-patent Document 1 is only applicable to vehicles that have a gasoline engine with a spark plug as the drive source but inapplicable to vehicles that have a diesel engine or a battery without a spark plug as the drive source. Then, apparatus that is capable to decrease the charge taken by a vehicle needs to be provided regardless of the type of the drive source.

Moreover, the device is preferably downsized to be applied to two-wheeled vehicles including motorcycles.

The present invention has been achieved in view of these problems. The objective of the present invention is to provide apparatus for reducing charge for a vehicle that is capable to decrease the charge taken by a vehicle regardless of the type of the drive source, which is more reasonable without relying on external energy supplied from, for example, a battery carried in a vehicle and which enables its small size.

Since keenly examined to solve the above-mentioned problems, the inventors have found that the inside of the body has a particular structure to achieve the above-mentioned objective and achieved the present invention.

The present invention is apparatus for reducing charge for a vehicle, including:

a body; and a conductive wire that extends from the body, in which the body includes:

a radiation generating layer containing a natural ore containing a radioactive substance;

a first metal layer containing a metal with a redox potential of 0 V or less or an alloy of a metal with a redox potential of 0 V or less; and a second metal layer containing a metal with a volume electric resistance rate of 5 $\mu\Omega\cdot cm$ or less at 0° C. or an alloy of a metal with a volume electric resistance rate of 5 $\mu\Omega\cdot cm$ or less at 0° C., and the conductive wire extends from the second metal layer and is electrically connective with at least one of a minus terminal of a battery provided in the vehicle and an electrically connective connection in the vehicle other than a plus terminal of the battery and a plus connection electrically connected with the plus terminal.

In the present invention, the dose of radiation generated from the radiation generating layer is preferably from 0.02 μSv/h or more to 0.2 μSv/h or less.

In the present invention, it is preferred that a first face of the radiation generating layer has a first magnet, a second face of the second metal layer has a second magnet, and the same poles of the first magnet and the second magnet face to each other.

In the present invention, the conductive wire is preferably electrically connective with any one selected from the minus terminal and the connection in the vehicle.

The user electrically connects the conductive wire of the apparatus with at least one of a minus terminal of a battery provided in the vehicle and an electrically connective connection in the vehicle other than the plus terminal of the battery, etc.

The radiation generating layer contains a natural ore containing a radioactive substance and generates radiation. This radiation ionizes a metal, etc., with a redox potential of 0V or less that forms the first metal layer. The negative charge caused by this ionization is delivered to each part of the vehicle via the second metal layer and the conductive wire. If electrically connected with a vehicle at least one part, the apparatus of the present invention can deliver negative charge to various parts of the vehicle because a vehicle such as a two-wheeled motor vehicle (motorcycle) and a four-wheeled motor vehicle (automobile) has one electrical circuit formed by the battery and the body. The delivered negative charge reduces the positive charge taken by the vehicle.

Accordingly, if the engine is a gasoline engine or a diesel engine, the engine performance decreased by the positive charge taken by the vehicle can be recovered. The driver experiences the improved force sensitivity and torque sensitivity, the decreased engine vibration, and the increase fuel cost, for example.

Moreover, if a battery is used as the power source for a vehicle such as an electric vehicle, an electric bike, or an electric wheelchair, the electricity usage is reduced by decreasing the friction. Additionally, the slowdown by turning the accelerator off is alleviated, so that the regenerative amount of the regenerative brake can be increased. This enables the cruising range of a vehicle to increase. Additionally, if the vehicle is a hybrid vehicle, the operating time of the engine to generate electric energy is decreased.

Even if the drive source is any one of a gasoline engine, a diesel engine, and a battery, the riding comfort of the vehicle is improved. The driver can experience the decreased vibration of tires, the improved road surface following property, and the increased driving stability.

The apparatus of the present invention can decrease the charge taken by a vehicle regardless of the type of the drive source. Furthermore, the apparatus of the present invention is more reasonable without relying on external energy, for example, supplied from a battery carried in a vehicle and enables its small size.

Therefore, the present invention can provide versatile and reasonable apparatus for reducing charge for a vehicle.

DESCRIPTION OF EMBODIMENTS

Embodiments of the present invention will be specifically described below. The present invention is not limited to the following embodiments and can be appropriately modified within the scope of the objective of the present invention and achieved.

Apparatus for Reducing Charge for a Vehicle

Figure 1:
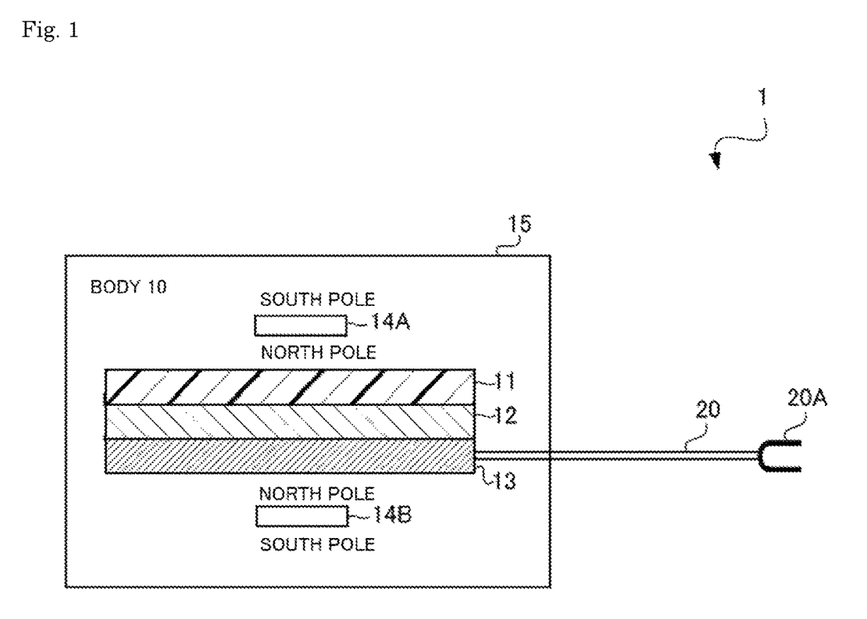
FIG. 1 shows a schematic pattern diagram of the apparatus for reducing charge for a vehicle 1 according to an embodiment.

FIG. 1 shows a schematic pattern diagram of the apparatus for reducing charge for a vehicle 1 according to an embodiment. The apparatus for reducing charge for a vehicle 1 includes a body 10 and a conductive wire 20 that extends from this body 10.

Body 10

The body 10 at least has a radiation generating layer 11, a first metal layer 12, and a second metal layer 13.

Although not required, it is preferred that the first face (one face) of the radiation generating layer 11 have a first magnet 14A, and the second face (the other face) of the second metal layer 13 have a second magnet 14B. These members (the radiation generating layer 11, the first metal layer 12, the second metal layer 13, the first magnet 14A, and the second magnet 14B) are contained in a container 15.

Radiation Generating Layer 11

The radiation generating layer 11 contains a natural ore containing a radioactive substance.

The natural ore is not limited in particular as long as the material contains a radioactive substance. Examples of the natural ore include monazite, radium ore, phosphate ore, columbite, tantalite, strueverite, pyrochlore, bastnasite, cerium concentrate, zircon, gummite, davidite, brannerite, uraninite (pitchblende), ningyoite, autunite, carnotite, tyuyamunite, meta-tyuyamunite, tyuyamunite ore, schroeckingerite, zirkelite, xenotime, hydrothorite, auerlite, maifan stone, allanite, tungsten ore, thorianite, brookite, uranophane, torbernite, coffinite, uranothorite, uranothorianite, thorite, and francevillite.

To more suitably ionize a metal, etc., contained in the first metal layer 12, the minimum dose of radiation generated from the radiation generating layer 11 is 0.02 μSv/h or more, preferably 0.05 μSv/h or more, particularly preferably 0.1 μSv/h or more.

The maximum dose of radiation generated from the radiation generating layer 11 is preferably 0.2 μSv/h or less, more preferably 0.15 μSv/h or less, particularly preferably 0.1 μSv/h or less. Defining the maximum dose of radiation can much more improve the safety of the use of radiation.

Defining the maximum dose of radiation can also reduce mineral ores used as the radiation sources to lead to the efficient use and the cost reduction of the natural ores.

In this embodiment, the dose of radiation includes a back-ground when a NaI scintillation survey meter is used (a dose in the case where no natural ore is contained in the radiation generating layer 11).

The minimum content of a natural ore is not limited in particular as long as the natural ore can generate radiation enough to activate a substance to be activated that exists inside the device. The minimum content of a natural ore is preferably 0.01 parts by mass or more, more preferably 0.1 parts by mass or more, particularly preferably 1 part by mass or more based on 100 parts by mass of the material forming the radiation generating layer 11.

The maximum content of a natural ore is not limited in particular as long as the dose of radiation generated from the radiation generating layer 11 can be adjusted to 0.2 μSv/h or less. The maximum content of a natural ore is preferably 90 parts by mass or less, more preferably 85 parts by mass or less, particularly preferably 80 parts by mass or less based on 100 parts by mass of the material forming the radiation generating layer 11.

The minimum thickness of the radiation generating layer 11 is not limited in particular as long as the natural ore can generate radiation enough to activate a substance to be activated that exists inside the device. The minimum thickness of the radiation generating layer 11 is preferably 0.01 mm or more, more preferably 0.05 mm or more, particularly preferably 0.1 mm or more.

The maximum thickness of the radiation generating layer 11 is not limited in particular but preferably 10 mm or less, more preferably 5 mm or less, particularly preferably 1 mm or less.

The radiation generating layer 11 preferably contains a natural ore and a resin composition as a resin mixture.

The resin is not limited in particular. Examples of the resin include an acryl resin, a polycarbonate resin, a polyester resin, a polystyrene resin, a polyolefin resin, a vinyl chloride resin, a polyimide resin, a silicone resin, and copolymers of any combination selected from these resins.

The radiation generating layer 11 may contain a widely used additive within a scope which does not affect the invention described in this embodiment. Examples of the additive include a viscosity modifier, a processing aid, a stabilizer, a fire retardant, a disaster prevention agent, an antioxidant, an antistat, an ultraviolet absorber, a filler, a colorant, and a foaming agent.

Although not required, the radiation generating layer 11 contains a powder of a metal with a redox potential of from −1.5 V or more to 0 V or less or a powder of an alloy of a metal with a redox potential of from −1.5 V or more to 0 V. The alloy preferably has a redox potential of from −1.5 V or more to 0 V or less. Since such a metal or an alloy powder is contained in the radiation generating layer 11, the radiation generated from the radiation generating layer 11 collides with the metal or the alloy powder to cause diffused reflection. When the radiation is delivered to the first metal layer 12, the dose of radiation reflected by the first metal layer 12 at a certain incidence angle and a certain reflection angle is increased. This can lead to increased activation of the substance.

As described below, to facilitate the handling of the metal or the alloy powder when the radiation generating layer 11 is prepared, the redox potential of the metal or the alloy powder contained in the radiation generating layer 11 is preferably −1.0 V or more, more preferably −0.75 V or more, further more preferably −0.5 V or more, particularly preferably −0.4 V or more.

To stimulate the diffused reflection of the radiation generated from the radiation generating layer 11, the particle size of the metal or the alloy powder contained in the radiation generating layer 11 is preferably as small as possible. However, the smaller the particle size is, the larger the surface area of the metal or the alloy is. Thus, a measure to prevent the spontaneous ignition of the metal or the alloy is required. To facilitate the handling of the metal or the alloy powder, the radiation generating layer 11 is preferred not to contain a metal or an alloy powder with a redox potential of less than −1.5 V, more preferably less than −1.0 V, further more preferably less than −0.75 V, still further more preferably less than −0.5 V, particularly preferably less than −0.4 V.

In this embodiment, "not to substantially contain" means that the amount of the metal or the alloy powder has risks associated with the spontaneous ignition caused by the above-mentioned metal or alloy powder and with the influence on the surrounding environment including the preparation device when the resin composition is prepared.

First Metal Layer 12

The first metal layer 12 contains a metal with a redox potential of 0 V or less or an alloy of a metal with a redox potential of 0 V or less. The alloy has a redox potential of 0 V or less. Since the first metal layer 12 contains a specific material, the dose of radiation generated from the radiation generating layer 11 is from 0.02 μSv/h or more to 0.2 μSv/h or less, which is extremely low. However, the radiation generated from the radiation generating layer 11 can suitably ionize the metal, etc., contained in the first metal layer 12. Thus, delivering the negative charge caused by the ionization to each part of the vehicle can suitably reduce the positive charge taken by a vehicle.

Examples of the metal with a redox potential of 0 V or less include lithium (−3.045 V), cesium (−2.923 V), rubidium (−2.924 V), potassium (−2.925 V), barium (−2.92 V), strontium (−2.89 V), calcium (−2.84 V), sodium (−2.714 V), magnesium (−2.356 V), thorium (−1.90 V), beryllium (−1.85 V), aluminum (−1.676 V), titanium (−1.63 V), zirconium (−1.534 V), manganese (−1.18 V), tantalum (−0.81 V), zinc (−0.7626 V), chrome (−0.74 V), iron (−0.44 V), cadmium (−0.4025 V), cobalt (−0.277 V), nickel (−0.257 V), tin (−0.1375 V), and lead (−0.1263 V).

In order to more suitably generate negative charge, the redox potential of the metal or the alloy contained in the first metal layer 12 is preferably −0.4 V or less, more preferably −1.0 V or less, further more preferably −1.5 V or less, still further more preferably −2.0 V or less, particularly preferably −2.5 V or less.

In this embodiment, the first metal layer 12 is preferably a plate or a foil. This reduces the surface area to make the metal or the alloy hard to spontaneously ignite, compared with the powder. Even if the metal or the alloy has a low redox potential, the first metal layer 12 can be relatively handled.

On the other hand, a metal with a redox potential of more than 0 V cannot preferably generate negative charge unless the dose of radiation generated from the radiation generating layer 11 is increased to more than 0.2 μSv/h The minimum thickness of the first metal layer 12 is not limited in particular as long as the ionized first metal layer 12 suitably generates negative charge. The minimum thickness of the first metal layer 12 is preferably 0.01 mm or more, more preferably 0.05 mm or more, further more preferably 0.1 mm or more.

The maximum thickness of the first metal layer 12 is not limited in particular but preferably 10 mm or less, more preferably 5 mm or less, particularly preferably 1 mm or more.

Second Metal Layer 13

The second metal layer 13 containing a metal with a volume electric resistance rate of 5 μΩ·cm or less at 0° C. or the alloy of this metal. The alloy has a volume electric resistance rate of 5 μΩ·cm or less at 0° C.

The metal or the alloy contained in the second metal layer 13 is more conductive than that contained in the first metal layer 12. Particularly, a higher conductive metal or alloy contained in the second metal layer 13 is more preferable because the negative charge generated by the ionized metal, etc., contained in the first metal layer 12 can be more suitably made to be delivered to each part of a vehicle via the second metal layer 13 and the conductive wire 20.

The index that indicates conductivity is a volume electric resistance rate at 0° C., for example. Examples of a high conductive metal include silver (Ag, volume electric resistance rate: 1.5 μΩ·cm), copper (Cu, volume electric resistance rate: 1.6 μΩ·cm), gold (Au, volume electric resistance rate: 2.1 μΩ·cm), aluminum (Al, volume electric resistance rate: 2.5 μΩ·cm), beryllium (Be, volume electric resistance rate: 2.8 μΩ·cm), calcium (Ca, volume electric resistance rate: 3.2 μΩ·cm), magnesium (Mg, volume electric resistance rate: 3.9 μΩ·cm), sodium (Na, volume electric resistance rate: 4.2 μΩ·cm), rhodium (Rh, volume electric resistance rate: 4.3 μΩ·cm), and iridium (Ir, volume electric resistance rate: 4.7 μΩ·cm).

The volume electric resistance rate at 0° C. of the metal or the alloy contained in the second metal layer 13 is more preferably 4 μΩ·cm, further more preferably 3 μΩ·cm or less, still further more preferably 2.5 μΩ·cm or less, particularly preferably 2 μΩ·cm or less because the negative charge generated by the ionized higher conductive metal, etc., contained in the first metal layer 12 can be more suitably delivered to each part of a vehicle.

The minimum thickness of the second metal layer 13 is not limited in particular as long as the negative charge generated by the ionized metal, etc., contained in the first metal layer 12 can be more suitably delivered to each part of a vehicle via the second metal layer 13 and the conductive wire 20. The minimum thickness of the second metal layer 13 is preferably 0.01 mm or more, more preferably 0.05 mm or more, further more preferably 0.1 mm or more.

The maximum thickness of the second metal layer 13 is not limited in particular but preferably 10 mm or less, more preferably 5 mm or less, further more preferably 1 mm or more.

First Magnet 14A and Second Magnet 14B

Although not required, it is preferred that the first face (one face) of the radiation generating layer 11 have a first magnet 14A, and the second face (the other face) of the second metal layer 13 have a second magnet 14B. Furthermore, the same poles of the first magnet 14A and the second magnet 14B face to each other.

Since the same poles of the first magnet 14A and the second magnet 14B face to each other, magnetic repulsion is caused. This magnetic repulsion can enhances the capability to remove static electricity in the body 10.

The type of the first magnet 14A and the second magnet 14B is not limited in particular but preferably permanent magnet because it is maintenance free.

The north poles of the first magnet 14A and the second magnet 14B face to each other in FIG. 1. However, the present invention is not limited to this. The same poles of the first magnet 14A and the second magnet 14B only have to face to each other. However, to use the magnetic force more efficiently, north poles more preferably face to each other because magnetic lines flow from the north poles toward the south poles.

Container 15

The radiation generating layer 11, the first metal layer 12, the second metal layer 13, the first magnet 14A, and the second magnet 14B are contained in a container 15. The material of the container is not limited in particular.

Conductive Wire 20

The conductive wire 20 extends from the second metal layer 13. The head 20A of the conductive wire 20 is electrically connective with at least one of predetermined electrically connective connections in a vehicle including a minus terminal of a battery provided in the vehicle.

The above-mentioned predetermined connections are not limited in particular unless they are a plus terminal of the battery and a plus connection electrically connected with this plus terminal. For example, the head 20A of the conductive wire 20 is connective with the minus terminal of a battery provided in a vehicle, the outer face of the air intake pipe to the engine in a vehicle, the outer face of the engine coolant flow pipe in a vehicle, or the outer face of the engine oil flow pipe in a vehicle.

The head 20A of the conductive wire 20 is also connective with, for example, a metal portion not connected directly with a plus terminal, in the chassis, the frame, the exhaust device, the power transmission device, the ignition device, the air intake pipe, the power generation device, the air conditioner, the cooling device, the suspension device, the bumper, the engine, the transmission, the fuel tank, the fuel injection device, the hydraulic power unit, the supercharger, the steering, and the external shell.

On the other hand, an example of a part with which the head 20A of the conductive wire 20 is not connective is a plus terminal of the battery. The head 20A of the conductive wire 20 is not also connective with a metal portion connected directly with a plus terminal.

In this embodiment, the user electrically connects the head 20A of the conductive wire 20 of the apparatus for reducing charge for a vehicle 1 with at least one of a minus terminal of a battery provided in the vehicle and an electrically connective connection in the vehicle other than the plus terminal of the battery, etc.

The radiation generating layer 11 contains a natural ore containing a radioactive substance and generates radiation. This radiation ionizes a metal, etc., with a redox potential of 0V or less that forms the first metal layer 12. The negative charge caused by this ionization is delivered to each part of the vehicle via the second metal layer 13 and the conductive wire 20. If the apparatus for reducing charge for a vehicle 1 is electrically connected with a vehicle at least one part, negative charge can be delivered to various parts of the vehicle because a vehicle such as a two-wheeled motor vehicle (motorcycle) and a four-wheeled motor vehicle (automobile) has one electrical circuit formed by the battery and the body. The delivered negative charge reduces the positive charge taken by the vehicle.

Accordingly, if the engine is a gasoline engine or a diesel engine, the engine performance decreased by the positive charge taken by the vehicle can be recovered. The driver experiences the improved force sensitivity and torque sensitivity, the decreased engine vibration, and the increased fuel cost, for example.

Moreover, if a battery is used as the power source for a vehicle such as an electric vehicle, an electric bike, or an electric wheelchair, the electricity usage is reduced by decreasing the friction. Additionally, the slowdown by turning the accelerator off is alleviated, so that the regenerative amount of the regenerative brake can be increased. This enables the cruising range of a vehicle to increase. Additionally, if the vehicle is a hybrid vehicle, the operating time of the engine to generate electric energy decreases.

Even if the drive source is any one of a gasoline engine, a diesel engine, and a battery, the riding comfort of the vehicle is improved. The driver can experience the decreased vibration of tires, the improved road surface following property, and the increased driving stability.

The apparatus for reducing charge for a vehicle 1 can decrease the charge taken by a vehicle regardless of the type of the drive source. Furthermore, the apparatus for reducing charge for a vehicle 1 is more reasonable without relying on external energy, for example, supplied from a battery carried in a vehicle and enables its small size.

Variations

In this embodiment, the conductive wire 20 is electrically connective with at least one selected from a minus terminal and the above-mentioned connections in a vehicle (electrically connective connections in a vehicle other than a plus terminal of the battery and a plus connection electrically connected with the plus terminal). Existing apparatus requires two or more parts including a minus terminal to be connected. However, one connection is enough in the apparatus for reducing charge for a vehicle 1 of this embodiment. Thus, even a beginner can conveniently use the apparatus for reducing charge for a vehicle 1.

Figure 2:
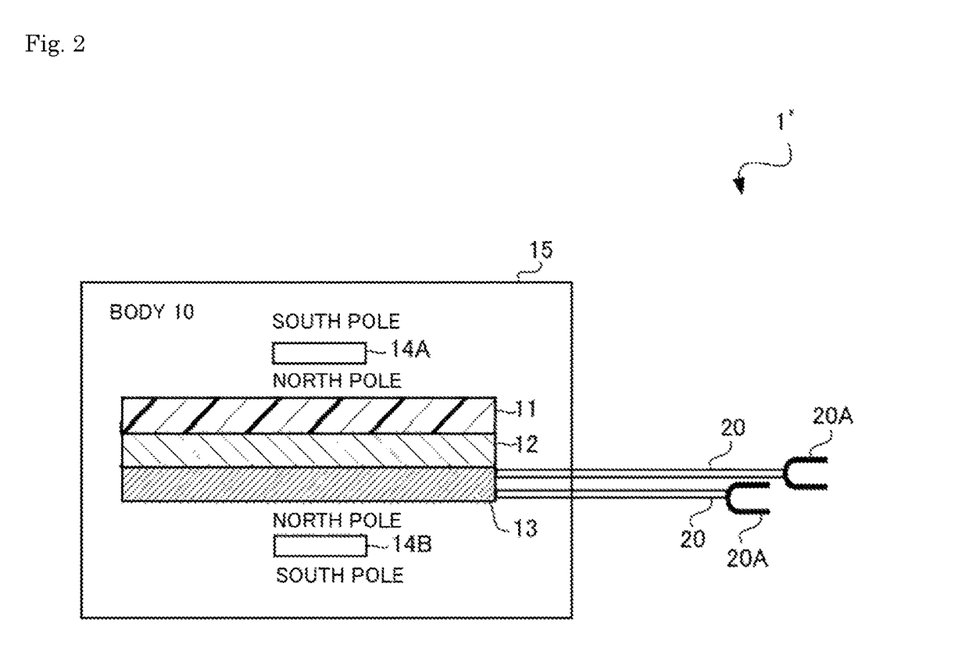
FIG. 2 shows a schematic pattern diagram of the apparatus for reducing charge for a vehicle 1' according to a first variation.

On the other hand, the conductive wire 20 may be electrically connective with two or more parts in a vehicle as shown in FIG. 2. This enables the electrons generated by the apparatus for reducing charge for a vehicle 1 to directly deliver to two or more parts in a vehicle. Thus, the effect to highly reduce the charge can be expected.

Figure 3:
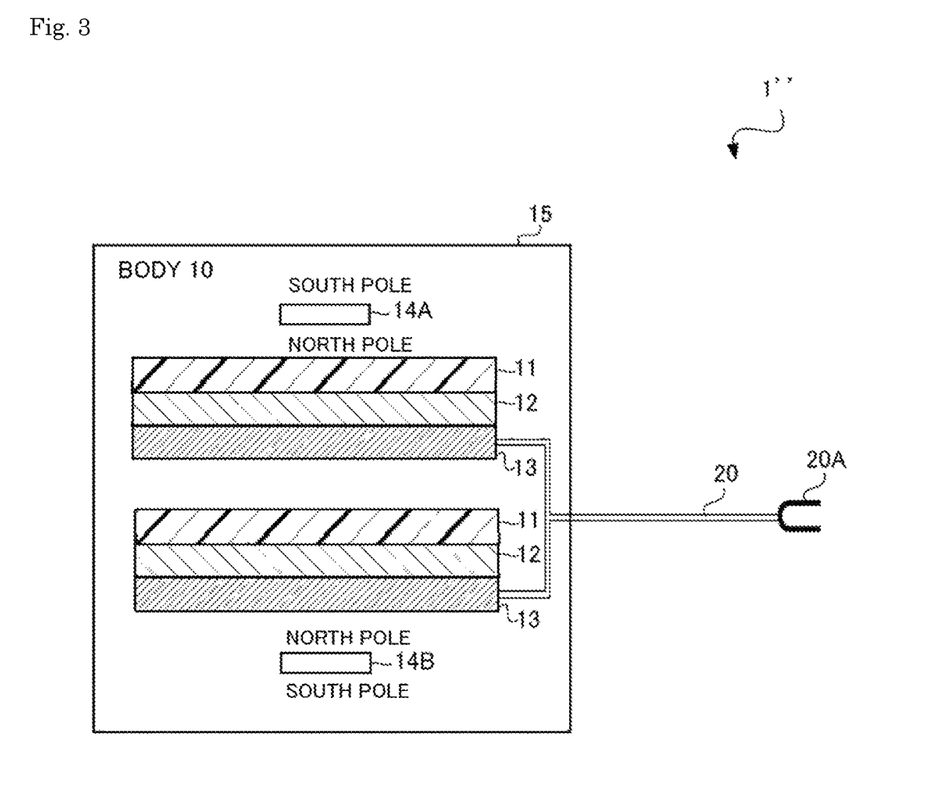
FIG. 3 shows a schematic pattern diagram of the apparatus for reducing charge for a vehicle 1" according to a second variation.
Figure 4:
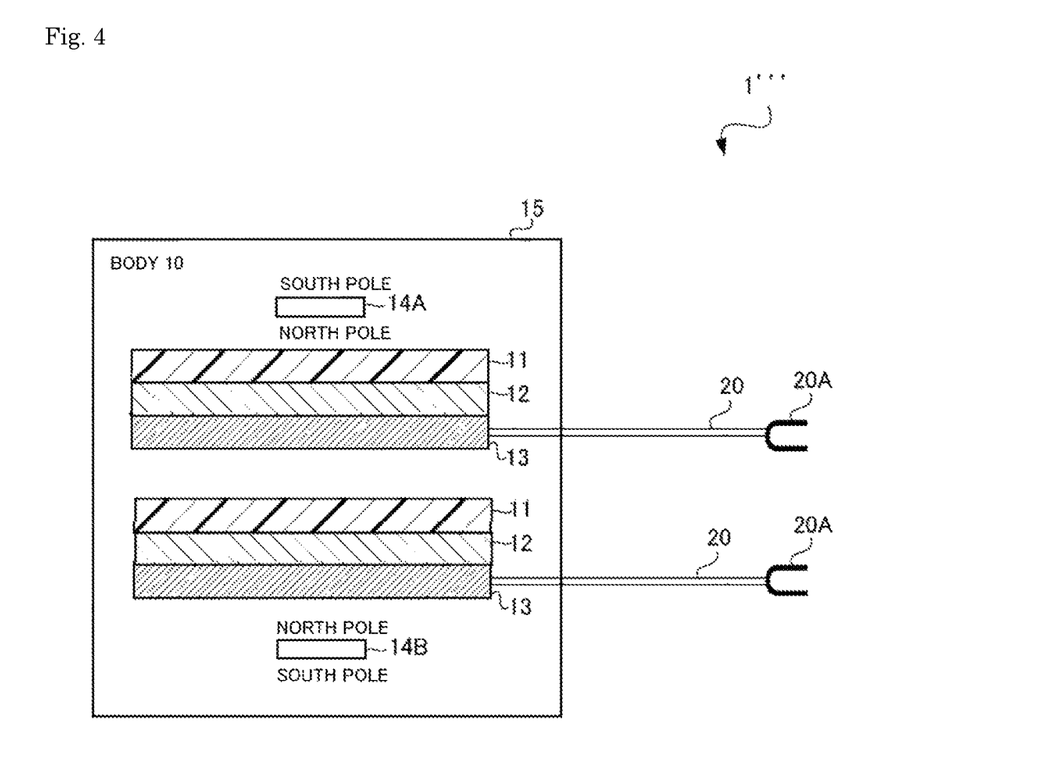
FIG. 4 shows a schematic pattern diagram of the apparatus for reducing charge for a vehicle 1'" according to a third variation.

Moreover, two or more combinations of the radiation generating layer 11, the first metal layer 12, and the second metal layer 13 may be contained in the container 15 as shown in FIGS. 3 and 4. This enables the electrons generated by the apparatus for reducing charge for a vehicle 1 to increase. Thus, the effect to highly reduce the charge can be expected.

Figure 5:
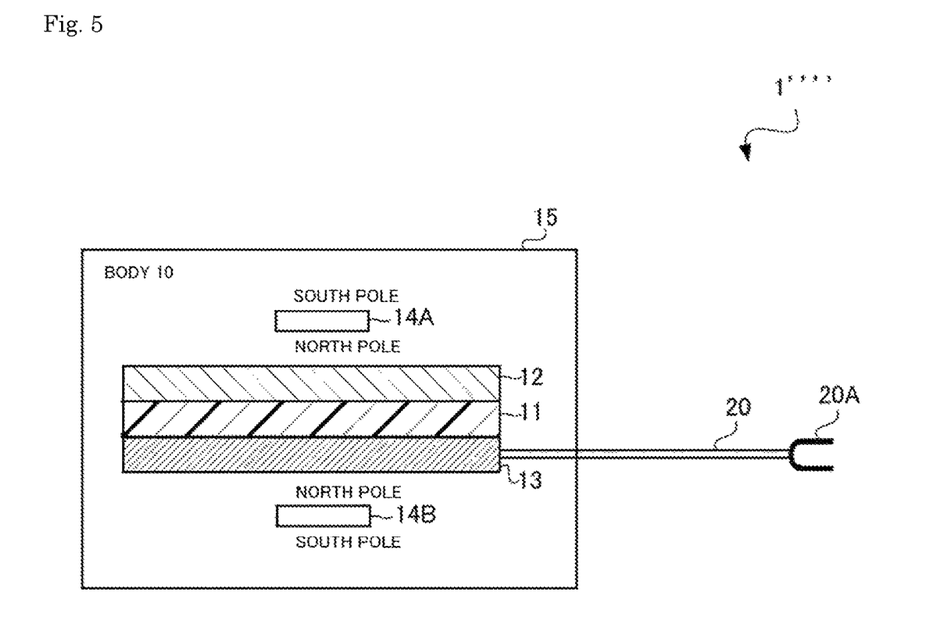
FIG. 5 shows a schematic pattern diagram of the apparatus for reducing charge for a vehicle 1"" according to a fourth variation.
Figure 6:
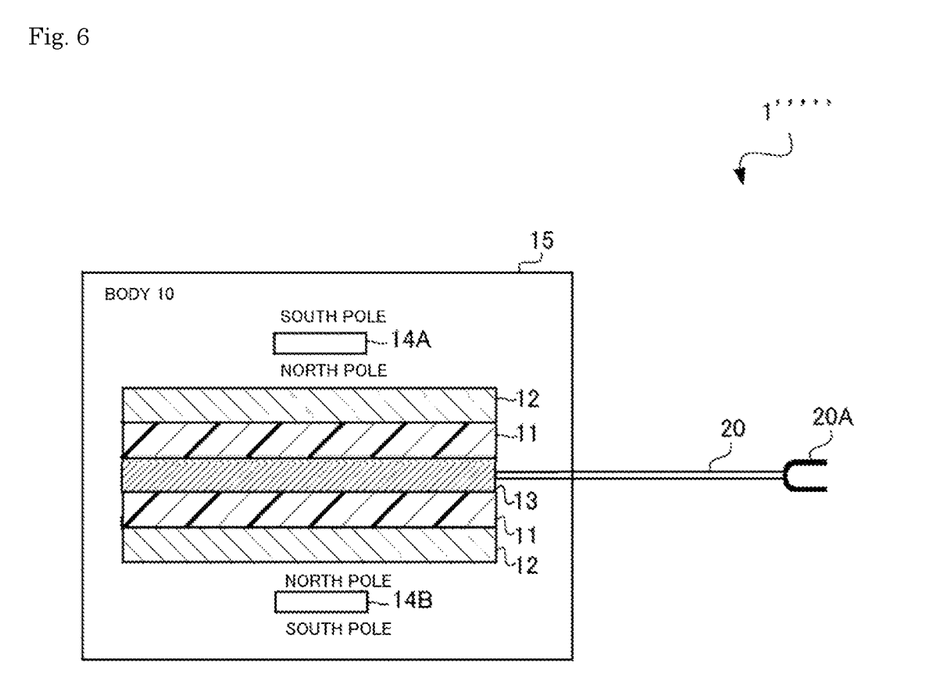
FIG. 6 shows a schematic pattern diagram of the apparatus for reducing charge for a vehicle 1""' according to a fifth variation.

In FIGS. 1 to 4, the radiation generating layer 11, the first metal layer 12, and the second metal layer 13 are arranged from one face in this order. However, the present invention is not limited to this order. The radiation generating layer 11 and the first metal layer 12 may be reversed to arrange the first metal layer 12, the radiation generating layer 11, and the second metal layer 13 from one face in this order as shown in FIG. 5. Moreover, the first metal layer 12, the radiation generating layer 11, the second metal layer 13, the radiation generating layer 11, and the first metal layer 12 may be arranged from one face in this order as shown in FIG. 6.

Since the apparatus described in this embodiment emits energy by the combination of a radioactive substance contained in the radiation generating layer 11 with a metal or alloy contained in the first metal layer 12, activates the metal or alloy contained in the second metal layer 13, and delivers electrons in a vehicle, it is not directed to energy. Therefore, the order of the radiation generating layer 11 and the first metal layer 12 is not limited in particular.

EXAMPLES

The present invention is specifically described below with reference to Examples but is not limited thereto.

Test Example 1

Example and Comparative Examples

Example 1-1

The head 20A of the conductive wire 20 of the apparatus for reducing charge for a vehicle 1 shown in FIG. 1 was electrically connected with the minus terminal of a battery provided in a car. The speed per hour is set to 80 km/h by using the cruise control function. The car travelled on the expressway (Chugoku expressway, between Kobe-Sanda and Takarazuka interchanges, a round trip of about 45 km) at a comparatively constant speed late at night. As the car for the test run, a KANGOO ZEN AT (engine type: DOHC 16-valve In-Line four, total emission: 1.598 L, maximum power (EEC): 78 kW (105 ps)/5,750 rpm, maximum torque (EEC): 148 N·m (15.1 kgm)/3,750 rpm) available from RENAULT S. A. was used. The fuel was unleaded premium gasoline.

Comparative Example 1-1

A TRICK STAR PPS DX Ver. available from TRICK STAR Nagoya (MOTOHOUSE) was used instead of the apparatus for reducing charge for a vehicle 1 shown in FIG. 1. The head of one conductive wire of the PPS was electrically connected with the minus terminal of a battery provided in the car. The head of the other conductive wire of the PPS was electrically connected with the plus terminal of a battery provided in the car. Otherwise, the test run was conducted by the same way as Example 1-1.

Comparative Example 1-2

The test run was conducted by the same way as Example 1-1 except that the apparatus for reducing charge for a vehicle was not used.

Evaluation of Fuel Cost

The fuel costs in the above-mentioned test runs were calculated based on the amount of the fuel consumed in the respective runs. As the result, it was confirmed that the fuel costs in Example 1-1, Comparative Example 1-1, and Comparative Example 1-2 were 18.182 km/L, 17.857 km/L, and 17.544 km/L, respectively.

Furthermore, it was confirmed that the use of the apparatus for reducing charge for a vehicle 1 shown in FIG. 1 (Example 1-1) produced an effect to improve the fuel cost by 3.6% compared with no use of the apparatus for reducing charge for a vehicle (Comparative Example 1-2). Furthermore, it was confirmed that even the apparatus for reducing charge for a vehicle that has a high performance known among the users (Comparative Example 1-1) produced an effect to improve the fuel cost by only 1.8%.

Test Example 2

Example and Comparative Example

Example 2

The head 20A of the conductive wire 20 of the apparatus for reducing charge for a vehicle 1 shown in FIG. 1 was electrically connected with the minus terminal of a battery provided in a motorcycle (two-wheeled motor vehicle). As the motor cycle, a R1200GS-LC available from BMW AG (engine type: 2 cylinder horizontal opposed, total emission:

1,196 cc, maximum power (EEC): 92 kW (125 ps)/7,750 rpm, maximum torque (EEC): 125 Nm/6,500 rpm was used. The fuel was high-octane gasoline. Eight monitors participate in this test.

Comparative Example 2

The test was conducted by the same way as Example 2 except that the apparatus for reducing charge for a vehicle was not used.

Evaluation

For example, the performance evaluation items of a motorcycle are the torque sensitivity, the smoothness of engine behavior, an increase in the engine revolutions, the maneuverability, the loudness of the engine noise, and the state of the suspension. These items are preferably but not easily quantified. Then, the above-mentioned items were evaluated by the eight monitors' senses.

Torque Sensitivity

The difference in the torque sensitivity (acceleration feel when the accelerator is opened to only the same degree) between Example 2 and Comparative Example 2 was evaluated. As the result, it was confirmed that Example 2 was more excellent in the initial acceleration of the motorcycle than Comparative Example 2.

Smoothness of Engine Behavior

In Example 2 and Comparative Example 2, (A) the speed of reaction when the accelerator was switched on and off and (B) the state of the motorcycle when the engine braking was used were evaluated. As the result, it was confirmed that (A) and (B) of Example 2 were more excellent than those of Comparative Example 2.

Increase in Engine Revolutions

In Example 2 and Comparative Example 2, the engine revolutions were increased from 1,500 revolutions/minute to 8,500 revolutions/minute. As the result, while Example 2 took a short time to increase the engine revolutions from 1,500 revolutions/minute to 8,500 revolutions/minute in a short time in Example 2, Comparative Example 2 took a longer time than Example 2.

Maneuverability

In Example 2 and Comparative Example 2, the maneuverability of the handle when the motorcycle ran in a figure of eight was evaluated. As the result, it was confirmed that Example 2 had more excellent maneuver of the handle than Comparative Example 2.

Loudness of Engine Noise

In Example 2 and Comparative Example 2, the loudness of the engine noise when the motorcycle ran on an asphalt road at 40 km per hour was evaluated. As the result, it was confirmed that Example 2 ran more quietly than Comparative Example 2.

State of Suspension

In Example 2 and Comparative Example 2, the state of the suspension was evaluated. As the result, it was confirmed that Example 2 ran in a more excellent state than Comparative Example 2. Particularly, the difference that Example 2 stably ran with absorbing impact on bumps on a winding road for rate inhibition even when the drivers become scared because the handle is shaken unless the speed was considerably reduced was confirmed.

REFERENCE SIGNS LIST

1 Apparatus for reducing charge for a vehicle
10 Body
11 Radiation generating layer
12 First metal layer
13 Second metal layer
14A First magnet
14B Second magnet
15 Container
20 Conductive wire

The invention claimed is:

1. Apparatus for reducing charge for a vehicle, comprising:
   a body; and
   a conductive wire that extends from the body, wherein the body includes:
   a radiation generating layer containing a natural ore containing a radioactive substance;
   a first metal layer containing a metal with a redox potential of 0 V or less or an alloy of a metal with a redox potential of 0 V or less,; and
   a second metal layer containing a metal with a volume electric resistance rate of 4.7 $\mu\Omega\cdot cm$ or less at 0° C. or an alloy of a metal with a volume electric resistance rate of 5 $\mu\Omega\cdot cm$ or less at 0° C., and
   the conductive wire extends from the second metal layer and is electrically connective with at least one of a minus terminal of a battery provided in the vehicle and an electrically connective connection in the vehicle other than a plus terminal of the battery and a plus connection electrically connected with the plus terminal.

2. The apparatus according to claim 1, wherein the dose of radiation generated from the radiation generating layer is from 0.02 $\mu Sv/h$ or more to 0.2 $\mu Sv/h$ or less.

3. The apparatus according to claim 1, wherein a first face of the radiation generating layer has a first magnet, a second face of the second metal layer has a second magnet, and the same poles of the first magnet and the second magnet face to each other.

4. The apparatus according to claim 1, wherein the conductive wire is electrically connective with any one selected from the minus terminal and the connection in the vehicle.

* * * * *